United States Patent [19]

Kazama et al.

[11] Patent Number: 5,409,525
[45] Date of Patent: Apr. 25, 1995

[54] HYDROUS GEL MEMBRANES FOR GAS SEPARATION

[75] Inventors: Shingo Kazama, Tokyo; Chiyoshi Kamizawa, Tsukuba, both of Japan

[73] Assignees: Agency of Industrial Science & Technology, Tokyo; Research Institute of Innovative Technology for the Earth, Kyoto; Nippon Steel Corporation, Tokyo, all of Japan

[21] Appl. No.: 128,098

[22] Filed: Sep. 29, 1993

[30] Foreign Application Priority Data

Sep. 30, 1992 [JP] Japan ................... 4-283486

[51] Int. Cl.$^6$ ............. B01D 53/22; B01D 69/10
[52] U.S. Cl. .................................. 96/14; 95/51
[58] Field of Search ............. 95/44, 51; 96/4, 5, 96/11-14

[56] References Cited

U.S. PATENT DOCUMENTS

| | | | |
|---|---|---|---|
| 3,396,510 | 8/1968 | Ward, III et al. | 95/44 |
| 4,318,714 | 3/1982 | Kimura et al. | 55/16 |
| 4,717,395 | 1/1988 | Chiao | 95/51 |
| 4,737,166 | 4/1988 | Matson et al. | 95/44 |

(List continued on next page.)

FOREIGN PATENT DOCUMENTS

| | | | |
|---|---|---|---|
| 60-90005 | 5/1985 | Japan . | |
| 63-190607 | 8/1988 | Japan | 96/14 |
| 63-278524 | 11/1988 | Japan | 96/14 |
| 1-81823 | 3/1989 | Japan . | |
| 1-159024 | 6/1989 | Japan . | |
| 1-194904 | 8/1989 | Japan | 96/14 |
| 1-194905 | 8/1989 | Japan | 96/14 |
| 8801183 | 12/1989 | Netherlands | 96/5 |

OTHER PUBLICATIONS

Carbon Dioxide Recovery Technology, NTS K.K. Kawai, Chapter 2, Chemical Absorption Process.
Chemistry of Carbon Dioxide, Kitano, Ichikawa, Cho, Inoue and Asada, 2-4, Chemical activation process of cerbon dioxide.
Selective Gas Permeability of Fluorine–Containing Polyamide Films, Yamaguchi University Faculty of Engineering.

(List continued on next page.)

*Primary Examiner*—Robert Spitzer
*Attorney, Agent, or Firm*—Birch, Stewart, Kolasch & Birch

[57] ABSTRACT

This invention relates to hydrous gel membranes for gas separation which comprise support membranes formed by solvent-soluble polymeric materials containing in their repeating unit a bulky structural part and hydrophilic functional groups represented by the following general formula (1)

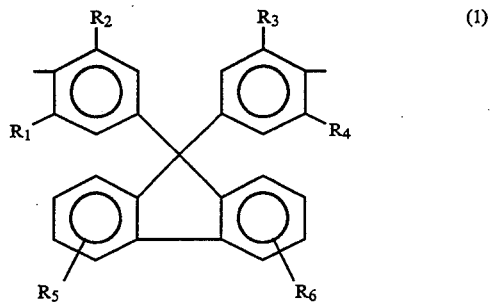

($R_1$, $R_2$, $R_3$, and $R_4$ designate hydrogen, alkyl group, and halogen and $R_5$ and $R_6$ designate any one of —H, —SO$_3$H, —COOH, and —OH) and water or an aqueous solution of substances with affinity for CO$_2$ substantially uniformly retained in the support membranes. The membranes show not only high CO$_2$ permeation and CO$_2$ selectivity but also long-term stable membrane performance and ease of fabricability into membranes and are capable of recovering a large volume of CO$_2$ generated at stationary sites efficiently at low cost.

9 Claims, No Drawings

U.S. PATENT DOCUMENTS

| | | |
|---|---|---|
| 4,824,443 | 4/1989 | Matson et al. ............................ 95/44 |
| 4,954,145 | 9/1990 | Thakore et al. ......................... 95/44 |
| 4,968,331 | 11/1990 | Sakashita et al. ..................... 96/14 X |
| 4,973,434 | 11/1990 | Sirkar et al. ............................ 96/5 X |
| 5,007,945 | 4/1991 | Tien et al. ............................. 96/14 X |
| 5,009,679 | 4/1991 | Angus et al. ......................... 96/14 X |
| 5,034,027 | 7/1991 | Tien et al. ............................. 96/14 X |
| 5,049,169 | 9/1991 | Teramoto et al. ........................ 96/14 |
| 5,071,452 | 12/1991 | Avrillon et al. ..................... 95/51 X |
| 5,110,326 | 5/1992 | Sirkar et al. ............................... 96/5 |
| 5,135,547 | 8/1992 | Tsou et al. ............................... 95/44 |
| 5,232,471 | 8/1993 | Chen et al. .......................... 96/14 X |
| 5,281,254 | 1/1994 | Birbara et al. ........................... 95/44 |

OTHER PUBLICATIONS

55th Annual Meeting of the Society of Chemical Engineers, Japan, Abstracts of Papers, p. 561 (1990).

Journal of Membrane Science, 6 (1980) 339–343 "Facilitated Transport In Ion–Exchange Membranes".

Separation Science and Technology, 23 (12 & 13), pp. 1611–1626, 1988, "Advanced Gas Separation Membrane Materials: Rigid Aromatic Polyamides".

Organic and Bio-organic Chemistry of Carbon Dioxide, Shohei Inoue, University of Tokyo, Japan.

Cardo Polymers, 1974, Marcel Dekker, Inc., pp. 45–142.

HYDROUS GEL MEMBRANES FOR GAS SEPARATION

FIELD OF THE INVENTION AND RELATED ART STATEMENT

This invention relates to gas separation membranes for selective permeation of $CO_2$ and, more specifically but not limited, to hydrous gel membranes for gas separation particularly useful for such applications as recovery of $CO_2$ generated at stationary sites and removal of $CO_2$ from natural gas.

In order to solve the environmental problem of reducing $CO_2$ in the atmosphere, studies are under way to recover $CO_2$ generated at stationary sites such as thermoelectric power plants and blast furnaces of steel mills and attention is attracted to the use of polymeric separation membranes for this purpose.

A large number of polymeric membranes for the selective separation of $CO_2$, such as the following, have been disclosed: fluorine-containing polyimide membranes in Polymer Preprints, 38 (7), 1955 (1989) of the Society of Polymer Science, Japan; polydimethylsiloxane-grafted polysulfone membranes in Japan Kokai Tokkyo Koho No. Sho 64-81,823 (1989); aromatic polybenzoxazoles in Japan Kokai Tokkyo Koho No. Hei 1-159,024 (1989); and fluorine-containing polyimide separation membranes in Separation Sci. and Tech., 23, (12 & 13), 1611 (1988).

However, these separation membranes do not necessarily possess sufficient ability to separate $CO_2$ and, as a result, it has been difficult to recover $CO_2$ generated at stationary sites efficiently and at low cost. Studies undertaken to improve the ability to separate $CO_2$ have developed polymeric membranes in the form of hydrous gels obtained by impregnating polymeric materials with an aqueous solution of a substance with a high affinity for $CO_2$. As for such hydrous gel membranes for gas separation, there is a report on the development of separation membranes which consist of poly(vinyl alcohol) impregnated with an aqueous solution of methylethanolamine and which show a selectivity of $CO_2$ of 70 over $N_2$ [The 55th Annual Meeting of the Society of Chemical Engineers, Japan, Abstracts of Papers, p 561 (1990)]. There is another report on the development of separation membranes for $CO_2$ consisting of sulfonic acid group-containing fluoropolymer ion exchanger resins impregnated with an aqueous solution of ethylenediamine and showing a selectivity of $CO_2$ of 600 over $N_2$ [J. Membr. Sci., 6 (3)0 pp 339-343 (1980); U.S. Pat. No. 4,318,714]. However, these hydrous gel membranes for gas separation still have problems with respect to the long-term stability of separating ability and fabricability of membranes and such problems must be solved before the membranes are put into practical use.

Gas separation membranes using hydrogels in their separating layers are disclosed in Japan Tokkyo Koho No. Hei 3-63,413 (1991), and a variety of polysaccharides, poly(acrylic acid), poly(vinyl alcohol), and others are disclosed as structural materials for the skeleton of such hydrogels. These hydrogels, however, cannot necessarily be said to have sufficient water retention and mechanical strength and they are used as composites with support layers. If it were possible to develop skeletal materials for hydrogels with such water retention and mechanical strength as to dispense with support layers, a marked improvement would be expected in the stability of hydrous gel membranes for gas separation. As a consequence, there has been a demand for the development of skeletal materials of improved properties for hydrogels.

Separation membranes with excellent $CO_2$ separating abilities are those membranes which show both high permeability of $CO_2$ and high selectivity of $CO_2$. After considering the base materials available for such high-quality separation membranes, water and aqueous solutions of substances with a high affinity for $CO_2$ seem to be ideal. Since $CO_2$ exists as a carbonate ion in water, it dissolves preferentially in water compared with other gases. For example, $CO_2$ shows a solubility of approximately 50 times that of $N_2$ in water at room temperature. Moreover, it is possible to dissolve selectively more $CO_2$ in water by letting $CO_2$ form salts or complexes with substances having a high affinity for $CO_2$ in water. Such being the case, it becomes possible to obtain separation membranes with high $CO_2$ selectivity with the use of water or an aqueous solution of a substance with a high affinity for $CO_2$ as functional substance for separation. Furthermore, $CO_2$ dissolved in water or in an aqueous solution of a substance with an affinity for $CO_2$ diffuses readily through the solution with the resultant high $CO_2$ permeation.

These liquid substances, however, are not able to maintain a specified shape by themselves and, where they are intended for use as separating layers in gas separation membranes, they must be used as liquid membranes formed on a porous support by impregnation. In the liquid membrane thus formed by impregnating the porous support with the solution, however, the solution after impregnation leaves the support easily, making it difficult to create a large pressure difference before and after the membrane. As a result, there exist problems with membrane performance, one relating to mechanical strength and the other to long-term stability of separation capability, which make it impossible to obtain practicable rates of permeation of gases.

The aforesaid hydrous gel membranes for gas separation based on poly(vinyl alcohol) impregnated with an aqueous solution of methylethanolamine, a substance with an affinity for $CO_2$, are said to be able to solve the problem relating to the mechanical strength. Poly(vinyl alcohol) used here as a polymeric material, however, possesses a glass transition temperature of 85° C. and the molecular motion of the polymer chain is not sufficiently suppressed at room temperature. In consequence, the molecules of water and methylethanolamine contained as impregnants readily diffuse through the poly(vinyl alcohol) and also readily slip out of the poly(vinyl alcohol), indicating the difficulties involved in maintaining the stable performance of the separation membrane over a prolonged period of time.

As a means to prevent the slipping out of the impregnating solution from the polymeric material of the support membrane, it is conceivable to use membrane-forming materials with less thermal motion of the polymer chain at room temperature or polymeric materials with a higher glass transition temperature as support membranes for the solution. As for hydrous gel membranes for gas separation prepared from polymers with a high glass transition temperature, there have been proposed separation membranes prepared by impregnating the sulfonic acid group-containing fluoropolymer ion exchange membrane (Nafion membrane from DuPont with no observable $T_g$) described above in respect to the prior art with an aqueous solution of ethylenediamine. However, the fluoropolymer ion exchange resin (Nafion) that is, that is used as a polymeric material is difficult to fabricate into membranes because of its insolubility in solvents and hence presents difficulties in fabricability into thin membranes, the essential requirement for separation membranes to be practicable.

As mentioned above, the requirements for the polymeric materials to be used as support membranes for hydrous gel membranes for gas separation are little thermal motion of polymer chains and good fabricability into membranes. These requirements could be satisfied by polymeric materials having a high glass transition temperature and excellent solvent solubility, if such materials were developed.

OBJECT AND SUMMARY OF THE INVENTION

The present inventors have conducted extensive studies on polymeric materials having properties suitable for supports for hydrous gel membranes for gas separation, have found that a specified bulky structure and hydrophilic functional groups introduced into the repeating unit of the polymers retain water and aqueous solutions of substances with affinity for $CO_2$ stably inside the polymers and, in addition, increase the solvent solubility and markedly improve the fabricability into membranes, and thus have completed this invention.

Accordingly, it is an object of this invention to improve hydrous gel membranes for gas separation to be formed from polymeric materials and to provide hydrous gel membranes for gas separation which show excellent permeation and $CO_2$ selectivity, which maintain stable membrane performance over a prolonged period of time, which are readily fabricated into membranes, and which recover a large volume of $CO_2$ generated at stationary sites efficiently at low cost.

This invention thus relates to hydrous gel membranes for gas separation which comprise support membranes formed by solvent-soluble polymeric materials containing in their repeating unit a bulky structural part and hydrophilic functional groups represented by the following general formula (1)

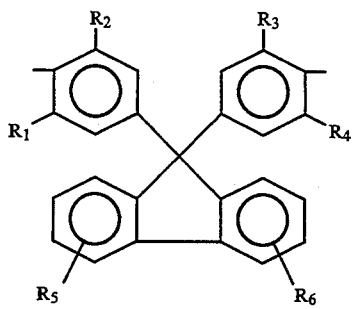

(1)

(hereinafter abbreviated sometimes simply as "bisphenylfluorene structure") wherein $R_1$, $R_2$, $R_3$, and $R_4$ designate any one of hydrogen atoms, alkyl groups, and halogens and $R_5$ and $R_6$ designate any one of —H, —$SO_3H$, —COOH, and —OH) and water or an aqueous solution of substances with an affinity for $CO_2$ retained substantially uniformly in said support membranes.

In order to solve the problem of insufficient stability of long-term membrane performance associated with the conventional hydrous gel membranes for gas separation and to improve the fabricability into membranes, a bulky structural part represented by the bisphenylfluorene structure and hydrophilic functional groups into the repeating unit of the polymeric materials forming the support membranes. The bulky structural part represented by the bisphenylfluorene structure suppresses the thermal motion of the polymer chains, stabilizes the polymeric materials thermally, makes the substances taken into the polymeric supports difficult to diffuse through the polymeric materials, and, in concert with the retaining effect of the hydrophilic functional groups, retains the substances well in the polymeric materials. In addition, the introduction of the bulky structural part represented by the bisphenylfluorene structure and the hydrophilic functional groups into the repeating unit of the polymeric materials forming the supports increases the solubility of the polymeric materials in solvents and improves the fabricability of polymeric materials into support membranes. The thermal motion of polymer chains is suppressed and the polymeric materials are thermally stabilized as a result of the introduction of the bulky structural part represented by the bisphenylfluorene structure into the polymeric materials. This is confirmed by an increase in glass transition temperature. A group of polymeric materials containing this bisphenylfluorene structure is called cardo polymers IV. V. Korshak et al., J. Macromol. Sci-Rev. Macromol. Chem., C11 (1), pp 45—142 (1974)1.

The polymeric materials to be used in this invention may be any of condensation polymerization type polymers such as polyamides, polysulfones, polyimides, polyesters, polycarbonates, and polyimideamides and vinyl polymers as long as they satisfy the requirements of this invention, that is, they contain a bulky structural part represented by the bisphenylfluorene structure and hydrophilic functional groups in their repeating unit.

In the hydrous gel membranes for gas separation of this invention, the bulky structural part represented by the bisphenylfluorene structure in the repeating unit means a structure which suppresses the rotation of the polymer backbone or creates a large number of fine voids (microvoids) inside the polymer matrix on account of its own bulkiness and is effective for retaining water and an aqueous solution of a substance with affinity for $CO_2$ (hereinafter sometimes abbreviated simply as "water and the like").

The effect characteristic of the polymeric materials containing a bulky structural part represented by the bisphenylfluorene structure can also be produced by introducing a variety of structures generally called "bulky structures" into the repeating unit of polymers or by introducing a variety of substituents generally called "bulky substituents" into specified locations of the repeating unit. However, the results are less pronounced than those produced by the bisphenylfluorene structure.

The following are concrete examples of the general bulky structures in the repeating unit of the above-mentioned polymer materials.

① 3,3-Bisphenylphthalide structure (phenolphthalein structure).

② 2,2-Bisphenylhexafluoropropane structure represented by the following formula (2).

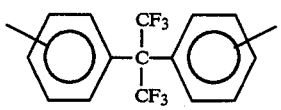

(2)

③ Structures containing aromatic rings such as anisolyl group or those containing substituents such as trifluoromethyl, trimethylsilyl, tert-butyl, and isopentyl groups.

④ Structures of linked aromatic rings containing two or more benzene rings present in the polymer backbone such as the naphthalene structure shown by the following formula (3).

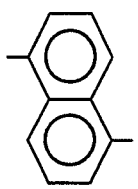

(3)

⑤ Structures having bulky substituents on both sides of the aromatic backbone represented by the following general formula (4)

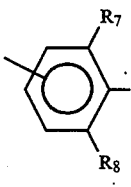

(4)

wherein $R_7$ and $R_8$ designate substituents such as alkyl, halogen, and trimethylsilyl groups.

In the structures represented by the general formula (4), a structure having a bulky substituent on one side of the aromatic backbone can suppress the rotation of the backbone and produce the effect of generating a large number of microvoids, but to a lesser extent than when bulky substituents are introduced on both sides of the backbone.

The polymeric materials to be used for forming support membranes in this invention show a high glass transition temperature as the bulky substituent represented by the bisphenylfluorene structure suppresses the rotation of the polymer backbone. For sufficient retention of water and the like, the glass transition temperature is preferably higher than 130° C., more preferably 150° C. or more, and most preferably 180° C. or more for strong retention of water and the like.

In the hydrous gel membranes for gas separation of this invention, the polymeric materials must be soluble in solvents in order to make the support membranes thin, and higher solvent solubility of the polymeric materials generally leads to better fabricability into membranes. As described above, the introduction of a bulky structural part represented by the bisphenylfluorene structure into the repeating unit of the polymer helps to generate microvoids in the polymeric materials and generally improves the solvent solubility of the polymeric materials. The aforesaid Nafion is comprised of polymers of tetrafluoroethylene with poor solvent solubility and this material is difficult to fabricate into thin membranes when used as separating layer.

In this invention, the content of the bulky structural part represented by the bisphenylfluorene structure to be introduced into the repeating unit of the polymer is 0.1 or more, preferably 0.2 or more, per 1 repeating unit, depending upon the kind of the bisphenylfluorene structure. The expression of 0.1 per one repeating unit here means that one bulky structural unit represented by the bisphenylfluorene structure is present for each 10 repeating units and no specific upper limit is observed. On condition that a suitable preparatory process is available, the higher the content of the bulky structural unit represented by the bisphenylfluorene structure, the greater the ability of the polymeric materials to retain water and the like and, furthermore, the higher the solvent solubility of the polymeric materials and the better the fabricability into membranes of the polymeric materials.

In summary, the polymeric materials having the bulky structural part represented by the bisphenylfluorene structure useful for the support membranes of this invention have the following features.

(a) Excellent ability to retain water and the like: The bulky bisphenylfluorene structure creates a large number of microvoids in the polymer matrix with water and the like retained in those microvoids and, in addition, suppresses the rotation of the polymer backbone with reduction of the diffusion of the retained water and the like. As a result, the polymeric materials having the bulky structural part represented by the bisphenylfluorene structure display an excellent ability to retain water and the like.

(b) Excellent fabricability: The polymeric materials having the bulky structural part represented by the bisphenylfluorene structure are highly soluble in a polar solvent such as N-methyl-2-pyrrolidone and can be fabricated with ease into thin membranes by solution casting or spreading on water.

(c) Excellent heat resistance: Any of the polymeric materials having the bulky structural part represented by the bisphenylfluorene structure shows excellent heat resistance. For example, the glass transition temperature (Tg) of a polysulfone containing the bisphenylfluorene structure is 280° C. and is much higher than that of a polysulfone containing the bisdihydroxyphenylisopropane (bisphenol A) structure, which is 180° C.

In addition, the introduction of hydrophilic functional groups into the repeating unit of polymers provides the polymeric materials with solvent solubility and produces a pronounced effect of retaining water and the like in the support membranes. The hydrophilic functional groups to be introduced into the repeating unit for this purpose include the sulfonic acid group, the carboxylic acid group, and the hydroxyl group, the sulfonic acid group being desirable.

The quantity of the hydrophilic functional groups required in the repeating unit of polymers in order to obtain the hydrous gel membranes for gas separation of this invention is 0.05 or more, preferably 0.1 or more, per one repeating unit, although it varies somewhat with the kind of the polymeric materials and with the introduced bisphenylfluorene structure. The quantity of the hydrophilic functional groups in the polymeric materials is indicated by the average number of the functional groups per one repeating unit and the expression of 0.05 per one repeating unit means the presence of one functional group in 20 repeating units. There is no upper limit to the quantity of the hydrophilic functional groups as far as the separating ability is concerned, but it is necessary to control the introduction of the hydrophilic functional groups to such an extent as not to cause dissolution in water or excessive swelling with water of the polymeric materials from the viewpoint of ease of handling in membrane fabrication. In consequence, where hydrophilic functional groups of more than this are to be introduced, it becomes necessary to prevent excessive swelling with water or dissolution in water, for example, by such means as introduction of a crosslinked structure. A concrete example of the quantity of hydrophilic functional groups is as follows; 0.05 to 1.4, preferably 0.1 to 1.0, of sulfonic acid group is introduced into a polysulfone containing one bisphenylfluorene structure per one repeating unit. Less than 0.05 sulfonic acid group cannot secure a sufficient ability to retain water and the like, while more than 1.4 sulfonic acid groups is undesirable as it causes excessive swelling of the polysulfone with water.

The polymer materials to be used for the fabrication of support membranes for anhydrous gel membranes for gas separation need to give the membranes sufficient strength and also need to be easy to handle, for example, easy to filter while in solution. In consequence, it is desirable for the polymeric materials to show an inherent viscosity of 0.2 to 1.5 dl/g, preferably 0.4 to 1.5 dl/g, determined on the basis of measurement of a solution of 0.5 g of the polymeric materials in 100 ml of N-methyl-2-pyrrollidone at 30° C.

In order to extract good performance in separation of $CO_2$ from the hydrous gel membranes for gas separation of this invention, there is a minimum requirement for water and the like to be retained in the polymeric materials. This minimum requirement depends upon the kind of linkage in polymer backbone, the kind of the bisphenylfluorene structure, and the kind of hydrophilic functional groups, but it is 0.1 part by weight or more, preferably 1 part by weight or more for better performance in separation, more preferably 2 parts by weight or more, of water and the like per 1 part by weight on dry basis of the polymeric materials. Water and the like of 5 parts by weight or more are needed for still higher permeation. There is no specific upper limit to the content of water and the like from the viewpoint of separating ability, although slight decrease is noticed. However, with the use of membranes containing more water and the like than is allowed by the ability of the polymeric materials to retain water and the like, the water and the like may come off the separation membranes and undesirably cause changes in performance of the membranes with time.

The substances with affinity for $CO_2$ to be used in the hydrous gel membranes for gas separation of this invention are those substances which are solid, liquid, or gaseous at room temperature and preferably soluble in water and show excellent physical or chemical affinity for $CO_2$.

Some of such substances with an affinity for $CO_2$ are described, for example, in Kitano and others, "Tansangasu no Kagaku (Chemistry of Carbon Dioxide)," Kyoritsu Shuppan (1976) and S. Inoue at al., "Organic and Bio-organic Chemistry of Carbon Dioxide," Kodansha Ltd., (1981) and the substances therein described may be used. To be specific, amines, inorganic salts, and transition metal complexes may be cited as substances with affinity for $CO_2$. Their examples include carbonates such as sodium carbonate and potassium carbonate, potassium phosphate, potassium fluoride, ethylenediamine, ethanolamine, diethanolamine, triethanolamine, methylethanolamine, diisopropanolamine, ammonia, polyethylene glycol dimethyl ether, and compounds of transition metals such as manganese, iron, cobalt, rhodium, iridium, nickel, copper, and platinum. They are in part used as components of absorbents in the conventional processes for recovery of $CO_2$ refer to Tansangasu "Kaishu Gijutsu (Carbon Dioxide Recovery Technology)," edited by Kawai and published by NTS K.K. (1991)] and these components are effective in the hydrous gel membranes for gas separation of this invention. These substances with affinity for $CO_2$ may be used singly or as a mixture of two or more.

In the hydrous gel membranes for gas separation of this invention, the proportion of water to the substances with an affinity for $CO_2$ is in the range from 100:0 to 1:99 by weight. The water here and $CO_2$ form carbonate ions and, as a result, produce the effect of dissolving $CO_2$ preferentially in the membranes compared with other gases while the substances with affinity for $CO_2$ form salts or complexes with $CO_2$ and enhance the preferential dissolution of $CO_2$.

In the hydrous gel membranes for gas separation of this invention, there is no specified process for letting the membranes retain water and an aqueous solution of a substance with affinity for $CO_2$ ("water and the like") and one or a plurality of the following processes may be used.

① To use a membrane-forming polymer solution containing water and/or a substance with affinity for $CO_2$.

② To use water or an aqueous solution of a substance with affinity for $CO_2$ as coagulating solution.

③ To add water and/or a substance with affinity for $CO_2$ to the coagulating solution.

④ To impregnate a formed polymeric membrane with water or an aqueous solution of a substance with affinity for $CO_2$.

⑤ To let the target gases to be separated containing water and the like act on the polymeric membranes or polymeric membranes retaining substances with affinity for $CO_2$ and to form under actual use conditions substantially hydrous gel membranes for gas separation of this invention.

The membrane-forming polymer solution here refers to a solution of polymeric materials in a suitable solvent, generally useful for membrane formation. The coagulating solution refers to a solution which is miscible with the solvent of a polymer solution but which does not substantially dissolve the polymeric materials.

In the hydrous gel membranes for gas separation of this invention, the polymeric materials forming the support membranes possess a bulky structural part represented by the bisphenylfluorene structure in the repeating unit and hydrophilic functional groups and the introduction of this bulky structural part suppresses the thermal motion of the polymer backbone. This in turn improves the thermal stability of the polymeric materials and increases the glass transition temperature and, at the same time, water and the like taken into the formed support membranes find it difficult to diffuse through the support membranes and so become retained with certainty in the support membranes. Moreover, the introduction of such a bulky structural part generates a structure with a large number of extremely fine voids, the so-called microvoids, inside the polymeric materials and the polymers dissolve by taking solvent molecules into such microvoids with the resultant increase in the solvent solubility of the polymeric materials. The microvoids are extremely fine voids of a molecular level generated in the gaps between molecular chains and, when formed in hydrous gel membranes for gas separation, they are highly effective for taking in the molecules of water and the substances with affinity to $CO_2$ and retaining them.

In consequence, the hydrous gel membranes for gas separation of this invention give off the retained water and the like less easily and perform the separation more stably over a prolonged period of time in comparison with the known hydrous gel membranes for gas separation of this kind. In addition, the fabrication of membranes is facilitated by excellent solvent solubility of the polymeric materials.

With the use of the hydrous gel membranes for gas separation of this invention, the gas molecules permeate primarily through the medium of water and the like retained between the gaps of polymer chains and, as a result, the water and the like retained in the support membranes contribute to produce high $CO_2$ permeation and high $CO_2$ selectivity in the separation of $CO_2$.

The hydrous gel membranes for gas separation of this invention are extremely useful for such applications as recovery of $CO_2$ generated at stationary sites and removal of $CO_2$ from natural gas on account of their high $CO_2$ permeability coefficient and $CO_2/N_2$ selectivity, stable membrane performance over a long period of time, and case of membrane fabrication.

DETAILED DESCRIPTION OF THE PREFERRED EMBODIMENTS

This invention will be described in detail below with reference to the accompanying examples and comparative examples.

In the following examples and comparative examples, the inherent viscosity (dl/g) which is an indicator of the degree of polymerization of a polymeric material is based on the value measured on a solution of 0.5 g of the polymer material in 100 ml of N-methyl-2-pyrrolidone at 30° C.

The glass transition temperature (Tg) was measured by DSC.

The content of water in a hydrous gel membrane for gas separation was determined by holding the membrane at 140° C. in a stream of nitrogen and measuring the loss in weight and is expressed in parts by weight of water and the like per 1 part by weight on dry basis of the polymeric material.

The permeability constant of gases was measured at 25° C. with the aid of a reduced-pressure gas permeation rate measuring apparatus equipped with a gas chromatograph for detection of permeated gases and the separation factor was obtained as the ratio of the gases ($CO_2$ permeability coefficient/$N_2$ permeability coefficient). The unit of this permeability coefficient is Barrer = $10^{-10}$ cm$^3$ (STP)·cm/cm$^2$·sec·cmHg.

EXAMPLE 1

Into a 1,000-ml four-necked flask fitted with a nitrogen inlet tube, a Dian-Stark trap, a reflux condenser, and a stirrer were introduced 0.10 mole of 9,9-bis(4-hydroxyphenyl)fluorene, 0.09 mole of 4,4'-dichlorodiphenyl sulfone, 0.01 mole of 4,4'-dichlorodiphenyl sulfone-3,3'-sulfonic acid, 0.12 mole of potassium carbonate, 320 g of N,N-dimethylacetamide, and 450 ml of toluene and the mixture was allowed to react by heating with stirring in an atmosphere of nitrogen. The heating was continued for 6.5 hours while keeping the reflux temperature at 120° C., water was removed by azeotropic distillation, the toluene was withdrawn to raise the temperature of the solvent up to 150° C., and the azeotropic distillation of water was continued at this temperature for 15 hours.

Upon completion of the reaction, the reaction mixture was cooled and filtered to remove an excess of the potassium carbonate and potassium chloride formed, and the filtrate was reprecipitated in water, washed, and dried to obtain a polysulfone.

The polysulfone thus obtained showed an inherent viscosity of 0.73 dl/g and a glass transition temperature (Tg) of 290° C. This polysulfone has the bulky bisphenylfluorene structure (1 per 1 repeating unit) and sulfonic acid group as hydrophilic functional group (0.2 per 1 repeating unit).

A 15% by weight solution of the polysulfone in N-methyl-2-pyrrolidone as membrane-forming polymer solution was applied to a glass plate and then immersed in water as coagulating solution to yield a transparent uniform hydrous gel membrane of the polysulfone with a thickness of 300 μm.

The hydrous gel membrane of the polysulfone contained 9 parts by weight of water per 1 part by weight of dry polymeric material and showed the following $CO_2$ permeability coefficient ($PCO_2$), $N_2$ permeability coefficient ($PN_2$), and separation factor ($PCO_2/PN_2$).

$PCO_2$: 410 Barrer
$PN_2$: 13 Barrer
$PCO_2/PN_2$: 32

EXAMPLE 2

The hydrous gel membrane of the polysulfone obtained in Example 1 was introduced into a glass vessel containing an aqueous amine solution consisting of 50 parts by weight of methylethanolamine and 50 parts by weight of water and left in an ultrasonic cleaner for 12 hours. The aqueous amine solution was replaced with a fresh one and the hydrous gel membrane was left immersed sufficiently long to replace the water in the membrane with the aqueous amine solution.

The $CO_2$ permeability coefficient ($PCO_2$), $N_2$ permeability coefficient ($PN_2$), and separation factor ($PCO_2/PN_2$) of the resulting hydrous gel membrane of the polysulfone are shown in Table 2.

$PCO_2$: 900 Barrer
$PN_2$: 12 Barrer
$PCO_2/PN_2$: 75

EXAMPLE 3

Into a three-necked flask fitted with a stirrer were introduced 0.015 mole of 9,9-bis(4-aminophenyl)fluorene, 0.015 mole of 3,3'-dimethyl-4,440-diaminobiphenyl-6,6'-disulfonic acid, 0.03 mole of 2,2-bis(3,4-biscarboxyphenyl)-1,1,1,3,3,3-hexafluoropropane dianhydride, and 150 ml of N-methylpyrrolidone and the mixture was allowed to react by keeping the solvent temperature at 180° C. and removing the water formed.

Upon completion of the reaction, the reaction solution was filtered through a glass filter and the filtrate was reprecipitated in methanol, washed, and dried in vacuum to yield a polyimide.

The polyimide thus obtained showed an inherent viscosity of 0.67 dl/g and a glass transition temperature (Tg) of 360° C. and possessed 0.5 bulky bisphenylfluorene structure per 1 repeating unit and 1 sulfonic acid group as hydrophilic functional group per 1 repeating unit.

A 15% by weight solution of the polyimide in N-methyl-2-pyrrolidone was applied to a glass plate and then immersed in water to yield a transparent uniform hydrous gel membrane of the polyimide with a thickness of 250 μm.

The hydrous gel membrane of the polyimide contained 10 parts by weight of water per 1 part by weight of dry polyimide. The hydrous gel membrane showed the following $CO_2$ permeability coefficient ($PCO_2$), $N_2$ permeability coefficient ($PN_2$), and separation factor ($PCO_2/PN_2$).
  $PCO_2$: 430 Barrer
  $PN_2$: 13 Barrer
  $PCO_2/PN_2$: 33

EXAMPLE 4

Into a 1,000-ml four-necked flask fitted with a nitrogen inlet tube, a Dian-Stark trap, a reflux condenser, and a stirrer were introduced 0.10 mole of 9,9-bis(4-hydroxyphenyl)fluorene-4-carboxylic acid, 0.10 mole of 4,4'-dichlorodiphenyl sulfone, 0.16 mole of potassium carbonate, 320 g of N,N-dimethylacetamide, and 450 ml of toluene and the mixture was allowed to react by heating with stirring in an atmosphere of nitrogen. The heating was continued overnight while keeping the reflux temperature at 120° C., water was removed by azeotropic distillation, the toluene was withdrawn to raise the temperature of the solvent up to 150° C., and the azeotropic distillation of water was continued at this temperature for 15 hours.

Upon completion of the reaction, the reaction mixture was cooled and filtered to remove an excess of the potassium carbonate and potassium chloride formed, and the filtrate was reprecipitated in water, washed, and dried to obtain a polysulfone.

The polysulfone thus obtained showed an inherent viscosity of 0.65 dl/g and a glass transition temperature (Tg) of 290° C. This polysulfone has 1 bulky bisphenylfluorene structure per 1 repeating unit and 1 carboxyl group as hydrophilic functional group per 1 repeating unit.

A 15% by weight solution of the polysulfone in N-methyl-2-pyrrolidone was applied to a glass plate and then immersed in water to yield a transparent uniform hydrous gel membrane of the polysulfone with a thickness of 210 μm.

The hydrous gel membrane of the polysulfone contained 7 parts by weight of water per 1 part by weight of dry polymeric material and showed the following $CO_2$ permeability coefficient ($PCO_2$), $N_2$ permeability coefficient ($PN_2$), and separation factor ($PCO_2/PN_2$).
  $PCO_2$: 390 Barrer
  $PN_2$: 13 Barrer
  $PCO_2/PN_2$: 31

EXAMPLE 5

A solution of 20 parts by weight of the hydrous gel membrane of the polysulfone obtained in Example 1 and 20 parts by weight of triethanolamine in 80 parts by weight of N-methyl-pyrrolidone was applied to a glass plate and then immersed in a coagulating solution consisting of 25 parts by weight of water and 75 parts by weight of triethanolamine to yield a transparent uniform hydrous gel membrane of the polysulfone with a thickness of 170 μm.

The hydrous gel membrane of the polysulfone contained 3 parts by weight of water per 1 part by weight of dry polymer and showed the following $CO_2$ permeability coefficient ($PCO_2$), $N_2$ permeability coefficient ($PN_2$), and separation factor ($PCO_2/PN_2$).
  $PCO_2$: 950 Barrer
  $PN_2$: 10 Barrer
  $PCO_2/PN_2$: 95

EXAMPLE 6

The hydrous gel membrane obtained in Example 5 was dried under reduced pressure to remove part of the water and the like. The resulting hydrous gel membrane had a thickness of 110 μm and showed the following $CO_2$ permeability coefficient ($PCO_2$), $N_2$ permeability coefficient ($PN_2$), and separation factor ($PCO_2/PN_2$).
  $PCO_2$: 710 Barrer
  $PN_2$: 3.4 Barrer
  $PCO_2/PN_2$: 209

COMPARATIVE EXAMPLE 1

Into a 1,000-ml four-necked flask fitted with a nitrogen inlet tube, a Dian-Stark trap, a reflux condenser, and a stirrer were introduced 0.10 mole of 9,9-bis(4-hydroxyphenyl)fluorene, 0.10 mole of 4,4'-dichlorodiphenyl sulfone, 0.11 mole of potassium carbonate, 320 g of N,N-dimethylacetamide, and 450 ml of toluene and the mixture was allowed to react by heating with stirring in an atmosphere of nitrogen. The heating was continued for 6.5 hours while keeping the reflux temperature at 120° C., water was removed by azeotropic distillation, the toluene was withdrawn to raise the temperature of the solvent up to 150° C., and the azeotropic distillation of water was continued at this temperature for 15 hours.

Upon completion of the reaction, the reaction mixture was cooled and filtered to remove an excess of the potassium carbonate and potassium chloride formed, and the filtrate was reprecipitated in water, washed, and dried to obtain a polysulfone.

The polysulfone thus obtained showed an inherent viscosity of 0.95 dl/g and a glass transition temperature (Tg) of 280° C. The polysulfone has 1 bulky bisphenylfluorene structure per 1 repeating unit but none of hydrophilic functional groups.

A 15% by weight solution of the polysulfone in N-methyl-2-pyrrolidone was applied to a glass plate and then immersed in water to yield a white unsymmetrical membrane [a membrane with a structure having a thin dense layer and a relatively thick pressure support layer: refer to Matsuura, "Goseimaku no Kiso (Fundamentals of Synthetic Membranes)," page 71 (1985), published by Kitami Shobo] but not the target hydrous gel membrane.

The 15% by weight solution of the polysulfone in N-methyl-2-pyrrolidone was also applied to a glass plate and the solvent was stripped off by heating to yield a uniform film. Leaving the film in water for 24 hours under the action of ultrasound did not yield the target hydrous gel membrane.

The film left immersed in water showed the following $CO_2$ permeability coefficient ($PCO_2$), $N_2$ permeability coefficient ($PN_2$), and separation factor ($PCO_2/PN_2$).
  $PCO_2$: 7.2 Barrer
  $PN_2$: 0.24 Barrer
  $PCO_2/PN_2$: 31

COMPARATIVE EXAMPLE 2

Into a 1,000-ml four-necked flask fitted with a nitrogen inlet tube, a Dian-Stark trap, a reflux condenser, and a stirrer were introduced 0.10 mole of 2,2-bis(4,4'-dihydroxyphenyl)isopropane (bisphenol A), 0.09 mole of 4,4'-dichlorodiphenyl sulfone, 0.01 mole of 4,4'-dichlorodiphenyl sulfone-3,3'-sulfonic acid, 0.12 mole of potassium carbonate, 320 g of N,N-dimethylacetamide, and 450 ml of toluene and the mixture was allowed to react by heating with stirring in an atmosphere of nitrogen. The heating was continued for 6.5 hours while keeping the reflux temperature at 120° C., water was removed by azeotropic distillation, the toluene was stripped off to raise the temperature of the solvent up to 150° C., and the azeotropic distillation of water was continued at this temperature for 15 hours.

Upon completion of the reaction, the reaction mixture was cooled and filtered to remove an excess of the potassium carbonate and potassium chloride formed, and the filtrate was reprecipitated in water and dried to yield a polysulfone.

The polysulfone thus obtained showed an inherent viscosity of 0.82 dl/g and a glass transition temperature (Tg) of 190° C. The polysulfone has 0.2 hydrophilic sulfonic acid group per 1 repeating unit but no bulky bisphenolfluorene structure.

A 15% by weight solution of the polysulfone in N-methyl-2-pyrrolidone was applied to a glass plate and then immersed in water to yield a white unsymmetrical membrane but not the target hydrous gel membrane.

The 15% by weight solution of the polysulfone in N-methyl-2-pyrrolidone was also applied to a glass plate and the solvent was stripped off by heating to yield a uniform film. Leaving the film in water for 24 hours under the action of ultrasound did not yield the target hydrous gel membrane.

The film left immersed in water showed the following $CO_2$, permeability coefficient ($PCO_2$), $N_2$ permeability coefficient ($PN_2$), and separation factor ($PCO_2/PN_2$).

$PCO_2$: 5.1 Barrer
$PN_2$: 0.16 Barrer
$PCO_2/PN_2$: 31

COMPARATIVE EXAMPLE 3

Commercial poly(vinyl alcohol) (number of repeating units or n=2,000) was dissolved in hot water to a concentration of 15% by weight and the solution was cast on a glass plate which had been kept warm and stripped of the water by heating to yield a poly(vinyl alcohol) film.

The film was impregnated with water in the usual manner to yield a hydrous membrane with a thickness of approximately 90 μm.

When tested for its performance for $CO_2$ separation, the hydrous membrane permeated too much of both $CO_2$ and $N_2$ to be measured and the composition of the permeated gas was identical with that of the feed gas. The membrane after the test suffered cracking due to drying.

This resulted from the drying of the membrane under the test conditions as the absence of the bulky bisphenylfluorene structure of this invention in poly(vinyl alcohol) weakened the ability of the polymer to retain water.

What is claimed is:

1. Hydrous gel membranes for gas separation which comprise support membranes formed by solvent-soluble polymeric materials containing in their repeating unit a bulky structural part and hydrophilic functional groups represented by the following general formula (1)

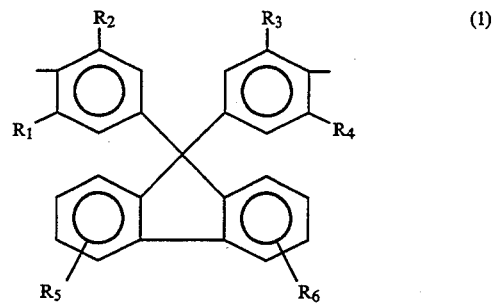

($R_1$, $R_2$, $R_3$, and $R_4$ designate hydrogen, alkyl group, and halogen and $R_5$ and $R_6$ designate any one of —H, —$SO_3H$, —COOH, and —OH) and water or an aqueous solution of substances with affinity for $CO_2$ substantially uniformly retained in said support membranes.

2. Hydrous gel membranes for gas separation described in claim 1 wherein said polymeric materials contain in their repeating unit one kind or two or more kinds of hydrophilic functional groups selected from —$SO_3H$, —COOH, —OH, and their salts.

3. Hydrous gel membranes for gas separation described in claim 2 wherein said substances with affinity for $CO_2$ are amines, inorganic salts, or transition metal complexes.

4. Hydrous gel membranes for gas separation described in claim 3 wherein one repeating unit of the polymers contains 0.1 or more of the bulky structural part represented by the general formula (1).

5. Hydrous gel membranes for gas separation described in claim 2 wherein one repeating unit of the polymers contains 0.1 or more of the bulky structural part represented by the general formula (1).

6. Hydrous gel membranes for gas separation described in claim 1 wherein said substances with affinity for $CO_2$ are amines, inorganic salts, or transition metal complexes.

7. Hydrous gel membranes for gas separation described in claim 6 wherein one repeating unit of the polymers contains 0.1 or more of the bulky structural part represented by the general formula (1).

8. Hydrous gel membranes for gas separation described in claim 1 wherein one repeating unit of the polymers contains 0.1 or more of the bulky structural part represented by the general formula (1).

9. Hydrous gel membranes for gas separation described in any one of claims 1 to 8 wherein one repeating unit of the polymers contains 0.05 or more of the hydrophilic functional groups.

* * * * *